US012614142B2

(12) United States Patent
Ahn et al.

(10) Patent No.: US 12,614,142 B2
(45) Date of Patent: Apr. 28, 2026

(54) EFFICIENT OPTIMAL FACILITY LOCATION DETERMINATION METHOD FOR CONVEX POSITION DEMAND POINT

(71) Applicant: POSTECH ACADEMY-INDUSTRY FOUNDATION, Pohang-si (KR)

(72) Inventors: Hee Kap Ahn, Pohang-si (KR); Tae Kang Eom, Pohang-si (KR); Jong Min Choi, Pohang-si (KR); Jae Gun Lee, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 141 days.

(21) Appl. No.: 18/496,700

(22) Filed: Oct. 27, 2023

(65) Prior Publication Data

US 2025/0069020 A1 Feb. 27, 2025

(30) Foreign Application Priority Data

Aug. 17, 2023 (KR) ........................ 10-2023-0107614

(51) Int. Cl.
*G06Q 10/067* (2023.01)

(52) U.S. Cl.
CPC .................................. *G06Q 10/067* (2013.01)

(58) Field of Classification Search
CPC .................................................... G06Q 10/067
USPC .......................................................... 705/348
See application file for complete search history.

(56) References Cited

U.S. PATENT DOCUMENTS 11,647,407 B1 * 5/2023 McKibben ............ H04W 16/02
                                                             370/329
2015/0235247 A1 * 8/2015 Saxena .............. G06Q 30/0205
                                                             705/7.34
2024/0070603 A1 * 2/2024 Putrevu ........... G06Q 10/08355

FOREIGN PATENT DOCUMENTS

CN           113269482 A * 8/2021 ........ B60W 60/0023
KR        20200036990 A * 4/2020 .............. G06F 8/65
KR     10-2022-0102112 A    7/2022
KR     10-2022-0109763 A    8/2022
        (Continued)

OTHER PUBLICATIONS

"Dynamic Programming," Wikipedia, https://en.wikipedia.org/wiki/
Dynamic_programming, retrieved May 12, 2025 (Year: 2025).*
                                                             (Continued)

*Primary Examiner* — Ilana L Spar
(74) *Attorney, Agent, or Firm* — Morgan, Lewis & Bockius LLP

(57) ABSTRACT

The present invention relates to an efficient optimal facility location determination method for convex demand position demand points implemented to arrange a plurality of facilities as close as possible to given demand locations when positions of the demand locations satisfy a convex position condition. According to the efficient optimal facility location determination method for convex position demand points of the present invention, when demand locations satisfy a convex position condition, it is possible to quickly calculate a method of efficiently arranging a plurality of facilities in a very short time. In addition, according to the present invention, even if positions of demand locations do not satisfy a convex position condition, it is possible to approximate arrangement of facilities, and to be applied to various fields such as a location selection of a warehouse or data clustering.

13 Claims, 7 Drawing Sheets

(56)        References Cited

FOREIGN PATENT DOCUMENTS

KR      10-2022-0137324  A      10/2022
KR      10-2023-0095770  A      6/2023

OTHER PUBLICATIONS

Parametric Search, Wikipedia. Accessed Feb. 9, 2023 https://web.archive.org/web/20230209112825/https://en.wikipedia.org/wiki/Parametric_search (Year: 2023).*
Binary Search Algorithm—Wikipedia. Accessed Feb. 12, 2023 https://web.archive.org/web/20230212061332/https://en.wikipedia.org/wiki/Binary_search_algorithm (Year: 2023).*
Binary search algorithm—Wikipedia (Year: 2023).*
Parametric Search—Wikipedia (Year: 2023).*
Cole, Richard, "Slowing Down Sorting Networks to Obtain Faster Sorting Algorithms", Journal of the Association for Computing Machinery, vol. 34, No. 1, Jan. 1987, pp. 200-208.
Gubias, LJ. and Hershberger, J., "Optimal Shortest Path Queries in a Simple Polygon", Journal of Computer and System Sciences 39, 126-152 (1989).
Wang, Haitao, "On the Planar Two-Center Problem and Circular Hulls", Discrete & Computational Geometry (DCG), vol. 68, pp. 1175-1226, 2022.
Notice of Allowance in Korean Application No. 10-2023-0107614, dated Sep. 3, 2025, 2 pages.

* cited by examiner

100

EFFICIENT OPTIMAL FACILITY LOCATION DETERMINATION METHOD FOR CONVEX POSITION DEMAND POINT

BACKGROUND

1. Field

The present invention relates to an optimal facility location determination method, and more specifically, to an efficient optimal facility location determination method for convex demand position demand points implemented to arrange a plurality of facilities as close as possible to given demand locations when positions of the demand locations satisfy a convex position condition.

Meanwhile, the present invention was made through two national project support.

For first project, Project Identification Number: 1711193606, Detailed Project Number: 2017-0-00905-007, Department Name: Ministry of Science and ICT, Research and Management Professional Institution: Institute of Information & Communications Technology Planning & Evaluation, Research Business Name: SW computing industry source technology development (R&D, Digitization), Research Project Name (SW Star Lab): Optimal Data Structure and Application Algorithm in Dynamic Geometry Environment, Contribution Rate: 50%, Organizer: POSTECH Research and Business Development Foundation, Research Period: 2023 Jan. 1 to 2023 Dec. 31.

For second project, Project Identification Number: 1711193975, Detailed Project Number: 2019-0-01906-005, Department Name: Ministry of Science and ICT. Research and Management Professional Institution: Institute of Information & Communications Technology Planning & Evaluation, Research Business Name: Information and Communication Broadcasting Innovation Talent Development, Research Project Name: Artificial Intelligence Graduate School Support (Pohang University of Science and Technology), Contribution Rate: 50%, Organizer: POSTECH Research and Business Development Foundation, Research Period: 2023 Jan. 1 to 2023 Dec. 31.

2. Description of Related Art

The optimal facility location determination problem is the problem of efficiently arranging facilities when given demand locations. It is used in various industries such as logistics and location-based services. Many techniques are known about the facility location determination method when the number of facility locations is one or two. However, it is known as a very difficult NP-hard problem to find the optimal facility location when there are $^k$ facility locations.

That is, it is very difficult to determine a facility location when there are no restrictions on positions of demand locations. An approximation algorithm is also known, but algorithms that approximate less than 1.93 times a minimum distance are also known as the NP-hard problem. Therefore, a method for accurately and efficiently arranging a plurality of facilities has not been known to date.

RELATED ART DOCUMENT

Non-Patent Document

[1] Jongmin Choi, Jaegun Lee, Hee-Kap Ahn, Efficient k-center algorithms for planar points in convex position. Algorithms and Data Structures Symposium (WADS 2023), pages 262-274, 2023

[2] Richard Cole. Slowing down sorting networks to obtain faster sorting algorithms. Journal of the ACM, 34(1):200-208, 1987.

[3] LJ Guibas and J Hershberger. Optimal shortest path queries in a simple polygon. Journal of Computer and System Sciences, 39(2):126-152, 1989.

[4] Haitao Wang. On the planar two-center problem and circular hulls. 36th International Symposium on Computational Geometry (SoCG 2020), pages 68:1-68:14, 2020.

SUMMARY

The present invention provides an efficient optimal facility location determination method for convex position demand points that is implemented to arrange a plurality of facilities as close as possible to given demand locations when positions of demand locations satisfy a convex position condition.

That is, the present invention aims to solve the problems of the existing technology, such as slow operation speed and low accuracy, only in special cases. Suppose demand locations are positioned at vertices (hereinafter referred to as a convex position) of a convex polygon, and $^k$ facilities may be arranged. When a distance from each demand location to a facility is a distance from the demand location to the nearest facility, the present invention is to quickly calculate facility locations to minimize a distance (hereinafter, optimal distance) of a demand location farthest to the facility.

When a set of points of demand locations at a convex position is P, and a set of $^k$ facilities is S, a distance from each point of p to S is $\min_{s \in S} d(p,s)$, and the optimal distance is the farthest distance among the distances from p to S, so $\max_{p \in P} \min_{s \in S} d(p,s)$. Therefore, the present invention is to quickly calculate the set of k elements with $\max_{p \in P} \min_{s \in S} s(p,s)$ mathematically expressing the object of the present invention as the minimum.

According to an aspect of the present invention, there is provided an efficient optimal facility location determination method for convex position demand points which relates to an optimal facility location determination method for arranging a plurality of facilities at an optimal position for a plurality of demand locations, the efficient optimal facility location determination method including: a determination step of determining whether the facility is arranged so that an optimal distance, which is a distance from the demand locations with a farthest distance to the facility, is less than or equal to a given distance; and an optimization step of calculating an optimal facility location so that a distance between the facility and the demand locations becomes the optimal distance.

The demand locations may satisfy a convex position condition in which the demand locations are positioned at vertices of a convex polygon.

The determination step may be performed using a decision algorithm, the optimization step may be performed using an optimization algorithm, and the decision algorithm may operate using dynamic programming.

The determination step may include: a first determination step applied when the number of facilities to be arranged is less than or equal to a reference value; and a second determination step applied when the number of facilities to be arranged exceeds the reference value.

The optimization step may include: a step of calculating a section including an optimal distance for calculating a section including the optimal distance; and a step of determining an optimal facility location for determining an optimal facility location within the section including the optimal distance.

The first determination step may proceed according to example Algorithm 1 below and the second determination step may proceed according to example Algorithm 2 below.

BRIEF DESCRIPTION OF DRAWINGS

FIG. 2A illustrates the case where the circle covers only one chain. FIG. 2B illustrates the case where one chain other than a chain including $p_i$ is additionally covered and the corresponding chain does not cover an opposite end point. FIG. 2C illustrates the case where a chain other than the chain including $p_i$ covers the opposite end point.

DETAILED DESCRIPTION

The present invention relates to a method of minimizing a maximum distance between facilities and demand locations by installing a specific number of facilities when positions of demand locations satisfy a convex position condition. Hereinafter, the contents of the present invention will be described in more detail with reference to drawings and algorithms.

Figure 1:
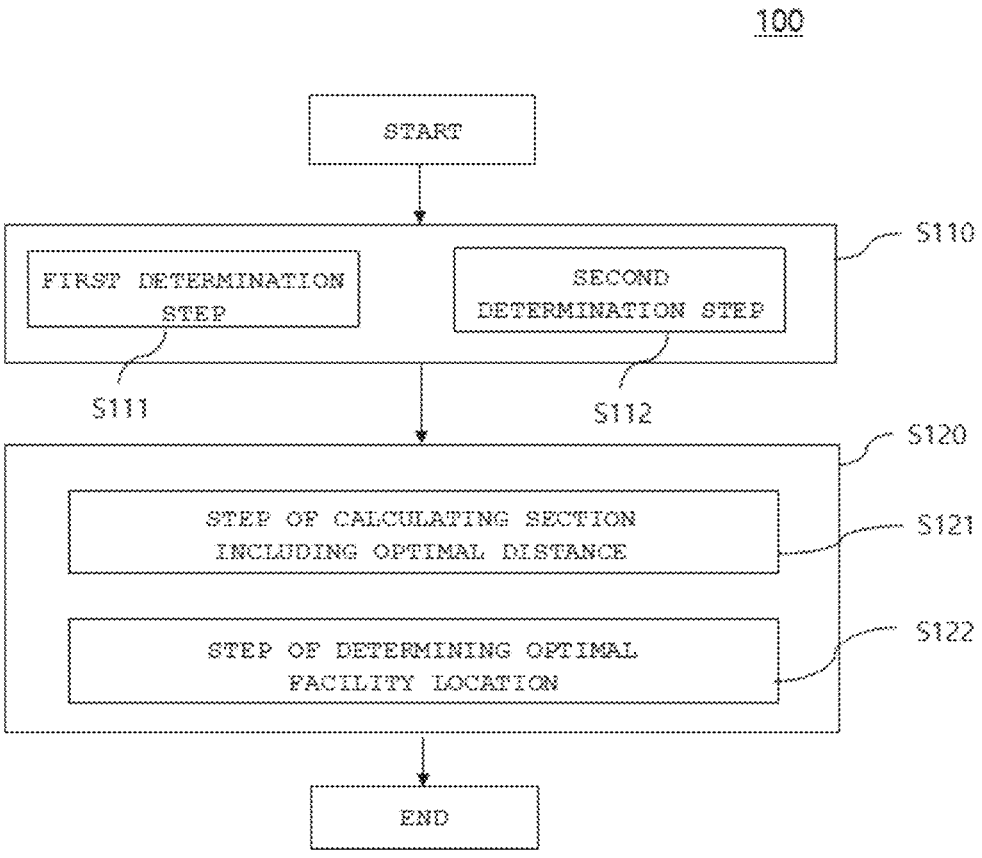
FIG. 1 is a flowchart for describing a process of efficient optimal facility location determination method for convex position demand points according to the present invention.

FIG. 1 is a flowchart for describing a process of efficient optimal facility location determination method for convex position demand points according to the present invention.

Referring to FIG. 1, an efficient optimal facility location determination method 100 for convex demand position demand points according to the present invention relates to an optimal facility location determination method for arranging a plurality of facilities in optimal positions for a plurality of demand locations, and includes a determination step (S110) and an optimization step (S120).

The determination step (S110) is a step of determining whether facilities may be arranged so that an optimal distance, which is a distance from the demand locations having the farthest distance to the facility, is less than or equal to a given distance. In this case, the determination step (S110) may be divided into a first determination step (S111) applicable in a case of k≤log n which is a situation where the number of facilities to be arranged is small and a second determination step (S112) applicable in a case of k>log n which is a situation where the number of facilities to be arranged is large.

The optimization step (S120) is a step of calculating an optimal facility location so that the distance between the facility and the demand locations becomes the optimal distance. In this case, the optimization step (S120) includes a step (S121) of calculating a section including an optimal distance of calculating the section including the optimal distance and a step (S122) of determining an optimal facility location for determining the optimal facility location.

Before describing a method of solving each step, the specific problem to be solved is defined in detail as follows. The number of demand locations is n, and the demand locations satisfy a convex position condition located at vertices of a certain convex polygon. In this case, the convex polygon may be expressed as P, and positions of each demand locations may be named $p_1, \ldots p_n$ by being ordered in a clockwise direction from the corresponding convex polygon. In the following description, an area within a radius $\gamma$ from a facility is referred to as a circle, and the demand locations are referred to as a point.

When a specific distance $\gamma$ is given, the determination step (S110) of determining whether all the points of the convex position may be covered with k circles with a radius $\gamma$ is solved using dynamic programming that calculates a value of f(i,l) in a 1≤i≤n, 1≤l≤k range. In the present invention, an efficient first determination step (S111) in a case of k≤log n which is a situation where the number of facilities to be arranged is small and an efficient second determination step (S112) in a case of k>log n which is a situation where the number of facilities to be arranged are large will be separately described.

f(i,l) may be defined as the maximum number of points that may be covered consecutively in a clockwise direction starting from $p_i$ using l circles with a radius $\gamma$. When f(i,l)=n for a certain i, the given points may be covered with l circles. When f(i,l)<n for all i, the given points may be covered with l circles. When calculating f(i,l), the number of different cases should be taken into account.

Figure 2A:
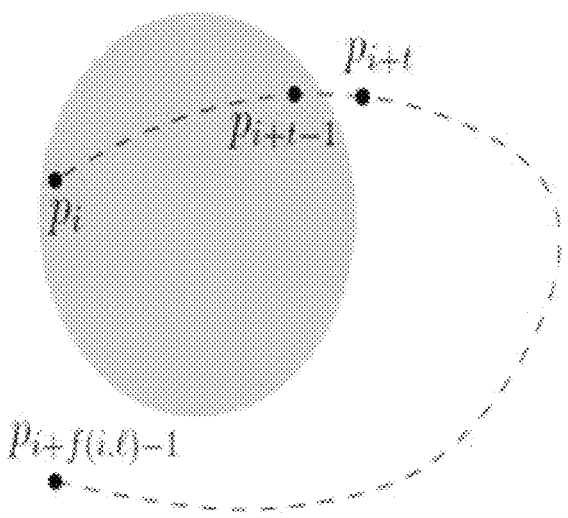
FIGS. 2A to 2C are schematic diagrams of three cases that a circle covering a point $p_i$ may have.
Figure 2B:
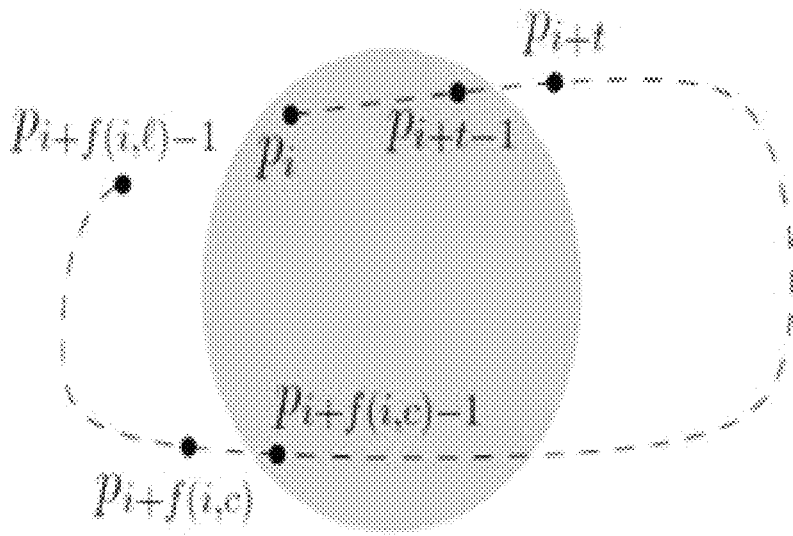
Figure 2C:
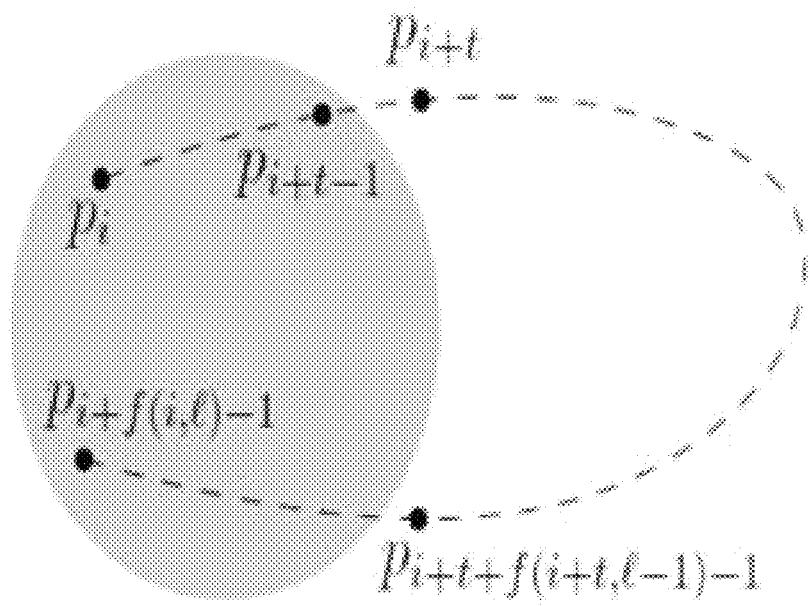
Figure 3:
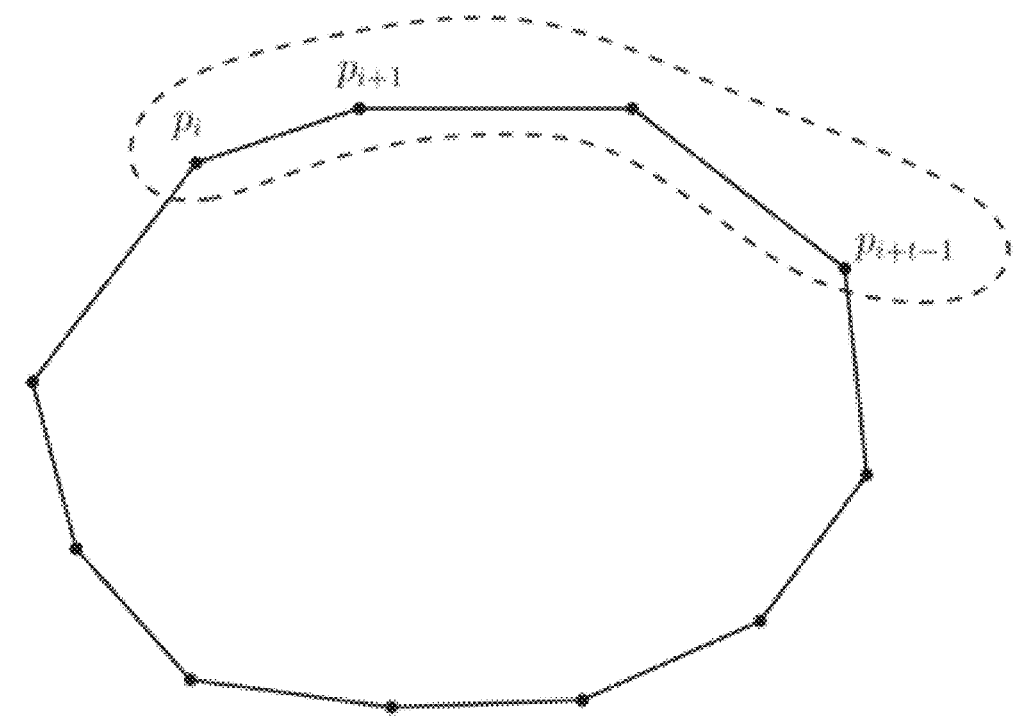
FIG. 3 is a schematic diagram of a chain having a length t starting at $p_i$.

FIGS. 2A to 2C are diagrams of three cases that a circle covering a point $p_i$ may have, and FIG. 3 is a schematic diagram of a chain having a length t starting at $p_i$.

Before describing the example of FIGS. 2A to 2C, a chain is defined as a subset of consecutive points of a convex polygon P. In FIG. 3, $\{p_i, p_{i+1}, \ldots, p_{i+t-1}\}$ is a chain with a starting point $p_i$ and a length t. Suppose S is the longest chain that may be covered with a circle covering $p_i$ while having $p_i$ as the starting point.

FIG. 2A illustrates that only one chain is covered with one circle, and that a circle covering S includes only S. FIG. 2B illustrates a case where one chain other than the chain including $p_i$ is covered and the corresponding chain does not cover the opposite end point, and illustrates the circle covering S includes another chain that does not include an end point. FIG. 2C illustrates a case where a chain other than the chain including $p_i$ covers the opposite end point, and illustrates that the circle covering S includes another chain including the end point.

When values of f(i,l) obtained by assuming that the circle covering S is included in one of FIGS. 2A, 2B, and 2C are $f_A(i,l)$, $f_B(i,l)$, and $f_C(i,l)$, respectively, f(i,l) becomes the largest value among the three.

In the case of FIGS. 2A and 2B, the circle covering $p_i$ does not cover the end point. First, for each 1≤γ≤l−1, the number of consecutive points that may be maximally covered with γ circles is obtained (f(i,γ)), and then, f(i+f(i,γ),l−γ) which is the number of consecutive points that may be covered at most using circles from $p_{i+f(i,\gamma)}$ to l−γ, is obtained. In this case, it can be seen that the largest value of f(i,γ)+f(i+f(i, γ),l−γ) is the number of consecutive points that may be maximally covered using l circles. Here, max$\{f_A(i,l),f_B(i,l)\}$ is min$\{n,max_{1\leq\gamma\leq l-1}\{f(i,\gamma)+f(i+f(i,\gamma),l-\gamma\}\}$.

Referring to FIG. 3, may be defined as a chain of a length t starting at $p_i$ and proceeding in a clockwise direction. Consider that, in the case of FIG. 2C, the number of l circles covers all consecutive points from $p_i$ to $p_{i+\beta-1}$. When the circle covering $p_i$ may cover up to $p_{i+t-1}$ (chain P(i,t)), then the remaining l−1 circles may cover f(i+t,l−1) consecutive points from $p_{i+t}$. Therefore, the circle covering (chain from $p_{i+t+f(i+t,l-1)}$ to $p_{\beta-1}$ should be covered. Therefore, $f_C(i,l)$ becomes the largest β in which there is 1≤t≤f(i,l) where the circle covering $p_i$ may cover both P(i,t) and P(i+t+f(i+t,l− 1),β−t−f(i+t,l−1)) (hereinafter P(i+t',β−t')).

Figure 5:
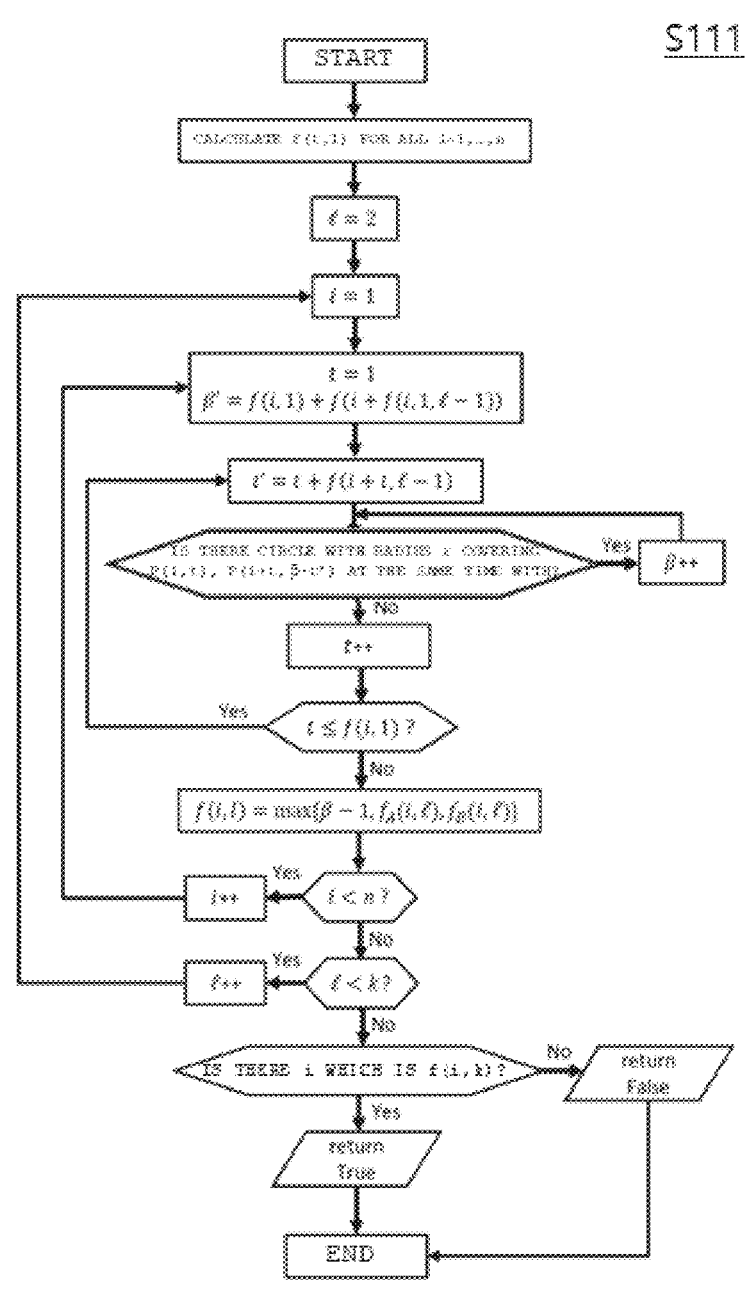
FIG. 5 is a flowchart for describing a process of an efficient algorithm when k≤log n among algorithms determining whether all points of a convex position may be covered with k circles with a radius $\gamma$.

In the case of k≤log n, it is only necessary to determine whether there is a circle that may cover P(i,t) and P(i+t',β−t'') by incrementing t and β by 1 (S111). This is the same as determining whether an intersection (hereinafter, $C_r(l,\beta)$) of circles with a radius γ centered on each point of P(i,t) and P(i+t',β−t') is an empty set. $C_r(t,\beta)$ for all of t,β that appear in the calculation of lines 6 to 12 of example Algorithm 1 for fixed i,l can be calculated in O(n) time, so $f_C(i,l)$ can be calculated in O(n) time. In addition, since all of f(i',γ), which is γ<l, have already been calculated, max$\{f_A(i,l),f_B(i,l)\}$ can be calculated in O(k) time. Since the number of pairs of i,l to be calculated is kn, the time required to execute example Algorithm 1 is $O(k^2n+kn^2)$. The process of obtaining all f(i,l) may be summarized as example Algorithm 1 (S111), and a flowchart of example Algorithm 1 is given in FIG. 5.

Example Algorithm 1

---

Algorithm decision 1 (p, k, r)

---

Input: Set of points P = $\{p_1,..., p_n\}$ satisfying convex position,
   the number of circles $^k$, radius $^r$ of circle
Output: Whether it is possible to cover all points of P
      with $^k$ circles with radius $^r$
1: Calculate f (i, 1) for all i=1, ..., n
2: for from l = 2 to k
3:   for from i=1 to k
4 :     t←1
5:      β← f (i, 1) + f (i, 1), l−1)
6:     while t≤ f (i, 1)
7:       if there is circle with radius $^r$ covering
         P(i, t), P(i+t+f (i+t, l−1), β−t−f (i+t, l−1) then
8:         β←β+1
9:      else
10:         t←t+1
11:    end if
12:  end while
13:       ▷ select maximum value among β−1
           and max $\{ F_A (i, l), F_B (i, l) \}$
14        f (i, l) ←max$\{\beta-1, min\{n,max_{1\leq\gamma\leq l-1}\{f (i, \gamma) +f (i+f (i, y),$
l−γ) }}}
15:   end for
16: end for
17: for from i=1 to n
18:  if f (i, k) =n then
19:    return True
20:  end if
21: end for
22: return False

---

Figure 6:
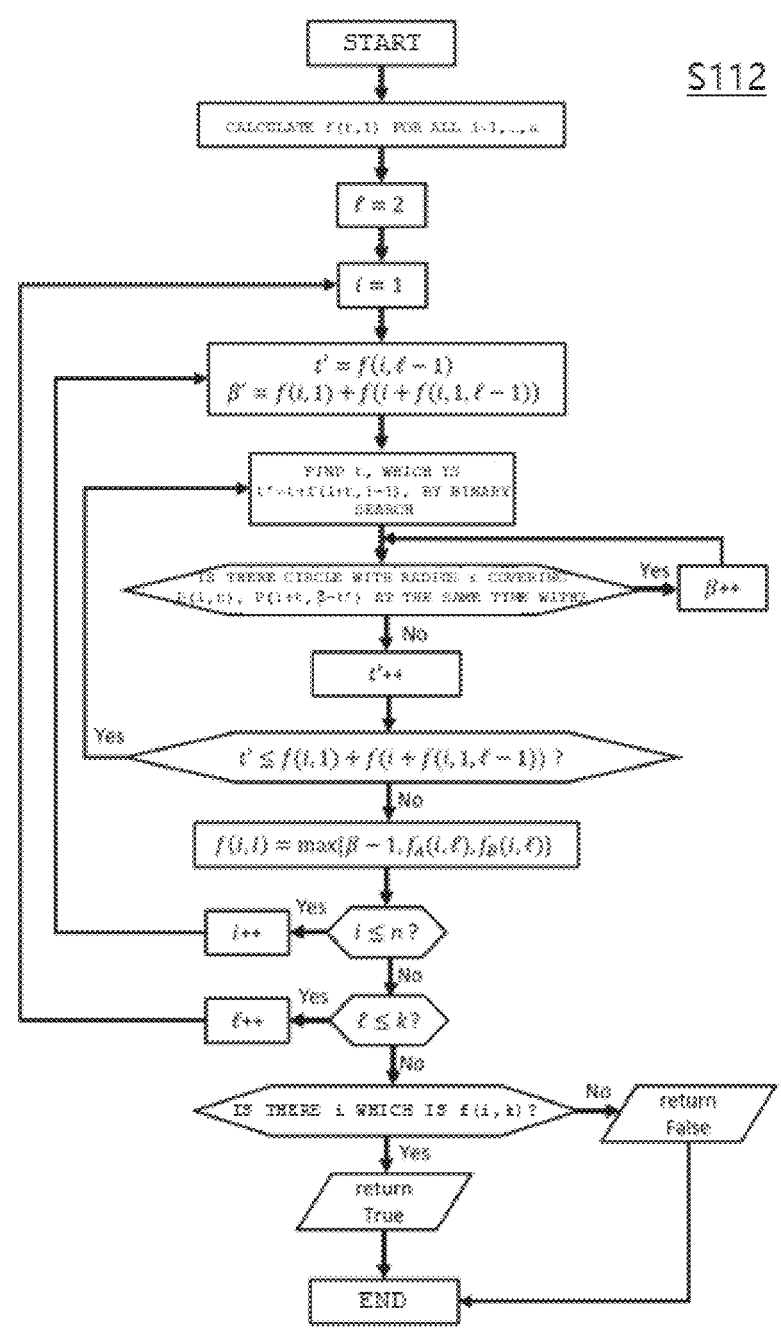
FIG. 6 is a flowchart for describing a process of an efficient algorithm when k>log n among algorithms determining whether all points of a convex position may be covered with k circles with a radius $\gamma$.
Figure 7:
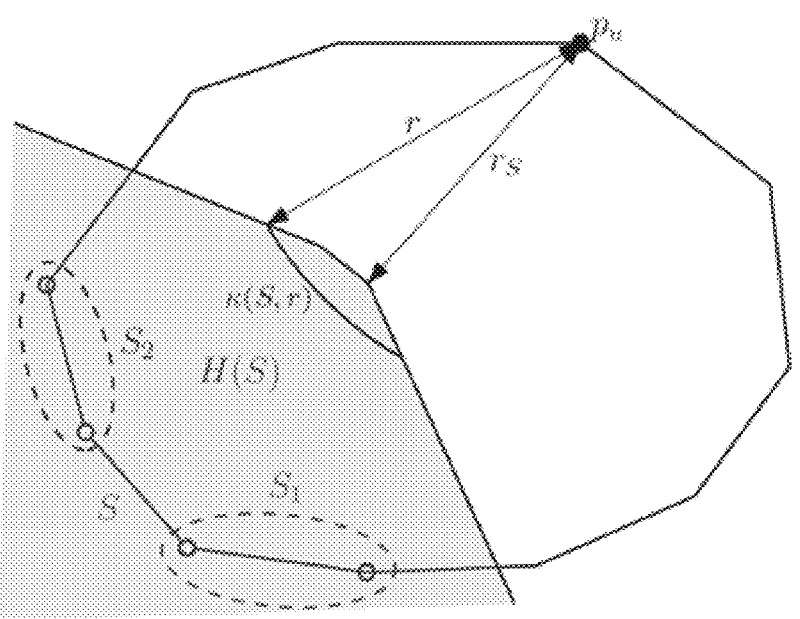
FIG. 7 is a schematic diagram of a situation when there is a circle with a radius $\gamma$ that covers both $p_u$ and a chain s for a vertex $p_u$ of P.

The example Algorithm 1 is efficient when k is small, but inefficient when k is large. Therefore, the algorithm (S112)

applicable to the case where k is large will be described in example Algorithm 2. A flowchart for example Algorithm 2 is given in FIG. 6.

Figure 4:
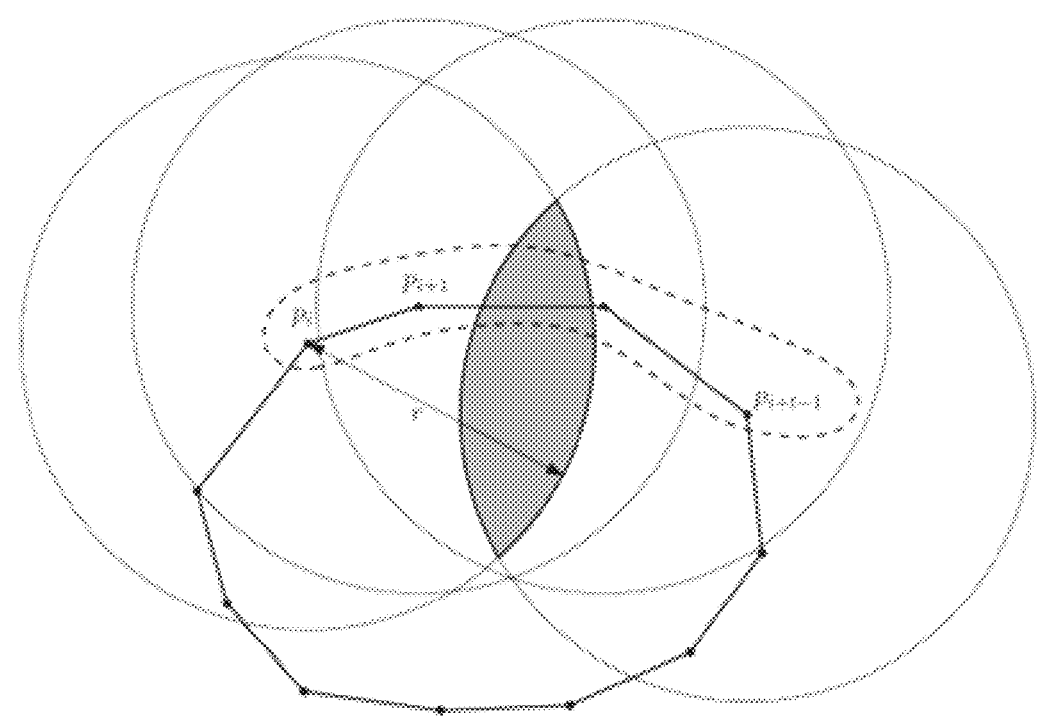
FIG. 4 is a schematic diagram of an intersection of circles with a radius $\gamma$ centered on each point of P(i,t).

Before executing example Algorithm 2, the intersection (see FIG. 4) of circles of radius γ centered on each point of P(i,t) is calculated using $O(n^2)$ time for all i,t. The difference from example Algorithm 1 is to increase t'=t+f(i+t,l−1) by 1, instead of increasing t by 1 in a while statement in lines 6 to 13, and find the corresponding t through binary search.

A range of t' for each l is [f(i,l−1),f(i,1)+f(i+f(i,1),l−1)], and when f(i+f(i,1),l−1)≤f(i,l) is used, pairs of t',β that appear when example Algorithm 2 is performed for all l are $O(n^2)$. For each t',β, the binary search takes O(log n) time. Since calculating max$\{f_A(i,l),f_B(i,l)\}$ for all i,l takes $O(k^2n)$ time as in example Algorithm 1, when the example Algorithm 2 is used, it may be determined whether it is possible to cover all points of k circles with a radius γ by calculating $O(n^2 \log n)$ time.

The binary search is an algorithm that finds a position of a specific value in a list sorted in ascending order, and when the length of the list is k, the search may proceed in O(k log k) time. The binary search first selects a median value in the list and compares a magnitude between the selected median value with a value to be found. When the median value is greater than the value to be found, the median value becomes a new maximum value, and when the median value is less than the value to be found, the median value becomes a new minimum value. Since t+f(i+t,l−1) is an increasing function for t, it is possible to find t satisfying t'=t+f(i+t,l−1) using the binary search.

Example Algorithm 2

---

Algorithm decision 2 (p, k, r)

---

Input: Set of points P = $\{p_1, \ldots, p_n\}$ satisfying convex position, the
   number of circles k, radius $^r$ of circle
Output: Whether it is possible to cover all points of P with $^k$
    circles with radius $^r$
1: Calculate f(i, 1) for all i=1, . . . , n
2: for from l=2 to k
3:  for from i=1 to n
4:    t'←f,(i, l−1)
5:    β←f (i,l) +f (i+f (i, 1),l−1)
6:    while t' ≤ f (i, 1) +f (i+f (i, 1), l−1)
7:     find t, which is t' =t+f (i+t, l−1), by binary search
8:     if there is circle with radius $^r$ covering P(i, t),
       P(i+t', β−t' ) then
9:       β←β+1
10:    else
11:       t'←t' +1
12:    end if
13:    end while
14:  f (i, l) ←max $\{\beta-1, min \{n, max_{1\leq\gamma\leq l-1}\{f (i, \gamma) +f (i+f (i, \gamma), l-\gamma) \} \} \}$
15:  end for
16: end for
17: for from i=1 to n
18:  if f (i, k) =n then
19:    return True
20:  end if
21: end for
22: return False

---

When in the case of k≤log n, example Algorithm 1 is used, and in the case of k>log n, example Algorithm 2 is used, it may be determined whether all points at the convex position may be covered with k circles with a radius γ in $O(n^2 \min(k, \log n+k^2n)$ time.

A process of obtaining an optimal distance $\gamma^*r$ is divided into the step (S121) of calculating a section including an optimal distance which is a process of obtaining a range $(\gamma_U, \gamma_R]$ including a minimum radius $\gamma^*$ that may cover n points with k circles and the step (S122) of determining an optimal facility location which is a process of accurately obtaining a value of $\gamma^*$ within the obtained range.

In the process of obtaining $(\gamma_U, \gamma_R]$, for each point $p_u$ of P, a data structure of obtaining a minimum radius of a circle including both $p_u$ and S for a set S of consecutive points within $P\backslash\{p_n\}$, is generated. In this case, $(\gamma_U, \gamma_R]$ has the same meaning as $\gamma_U < \gamma^* \leq \gamma_R$, and $P\backslash\{p_u\}$ means a set of points obtained by subtracting $p_u$ from the convex polygon P.

The data structure is in the form of a tree, and each node corresponds to a set of consecutive points within $P\backslash\{p_u\}$. When a set corresponding to a node W is S, children of W correspond to S1 and S2, respectively, divided by S in half, and a set of points corresponding to a leaf node, which is a terminal node without children, is composed of one point. For a point p on the plane, H(p) may be defined as an area that includes among planes divided by a perpendicular bisector of p and $p_u$, and for the set S of points, H(S) may be defined as an area $H(S)=\cap_{p\in S}H(p)$ having H(p) as an intersection for all p included in S.

In this case, for the set S of points corresponding to each node W of the tree, a distance $\gamma_S$ from H(S) and $p_u$ to S are recursively calculated using values obtained from the children of W and stored. Since the number of nodes is O(n) for each $p_u$, there are also O(n) values of $\gamma_S$. There are $O(n^2)$ values of $\gamma_S$, which are obtained for all $p_u$, and let a list of all the corresponding values be R. The binary search in an unsorted list R is performed as follows.

First, the median value $\gamma$ of R is found using $O(n^2)$ time (using a selection algorithm). Then, when the first determination step (S111) or the second determination step (S112) is performed using $\gamma$, one conclusion of $\gamma < \gamma^*$ or $\gamma \geq \gamma^*$ is obtained. If $\gamma < \gamma^*$, all values less than $\gamma$ are removed from R, and if $\gamma \geq \gamma^*$, all values greater than $\gamma$ are removed from R. Through the above process, for the list from which half of the elements in R are removed, the median value is found again and the decision algorithm is performed to remove half of the elements in the list. This process is repeated until the number of elements of R is two.

In this case, if the remaining element is $\gamma_U, \gamma_R(\gamma_U < \gamma_R)$, then $\gamma_U < \gamma^* \leq \gamma_R$, and the calculation of the range including $(\gamma_U, \gamma_R]$ is completed. In binary search, a total of $O(n^2)$ time is required to find the median value of the list and remove elements. Since the decision algorithm is used O(log n) times, a total of $O((n^2 \min\{k, \log n\}+k^2n)\log n)$ time is required. Therefore, the range $(\gamma_U, \gamma_R]$ including the optimal distance r may be calculated in $O((n^2 \min\{k, \log n\}+k^2n)\log n)$ time.

Figure 8:
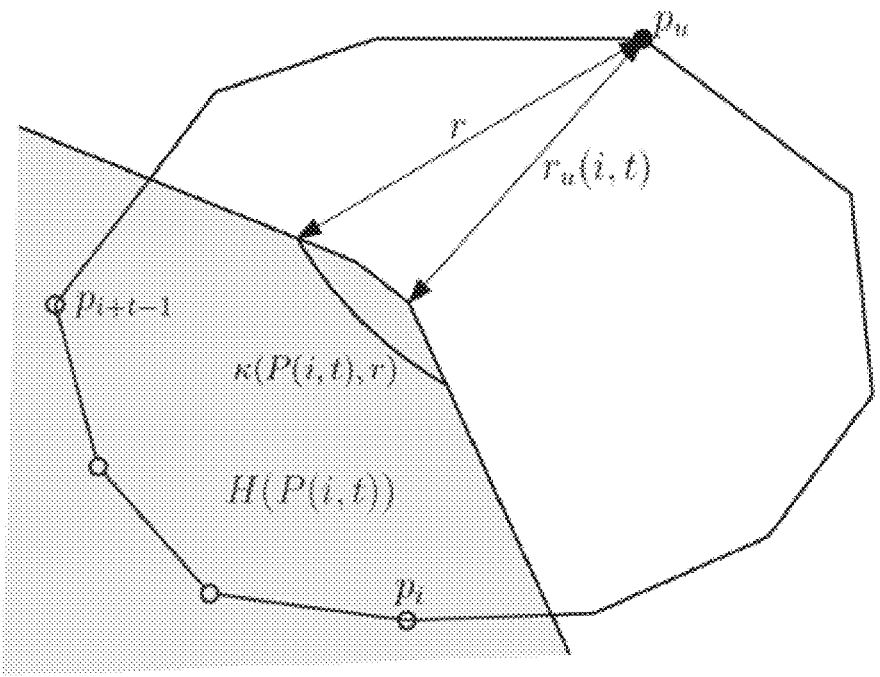
FIG. 8 is a schematic diagram of definition of $\chi(P(i,t),\gamma)$ and $\gamma_u(i,t)$ when there is a circle with a radius $\gamma$ covering both the vertex $p_u$ of P and a chain P(i,t).

Before describing the step (S122) of determining an optimal facility location, which is a process of obtaining $\gamma^*$ included in $(\gamma_U, \gamma_R]$ terms to be used in the process will be defined. $\gamma_u(i,t)$ is defined as the radius of the smallest circle that may cover both P(i,t) and $p_u$, and $t_u(i,\gamma)$ is defined as the largest $t(\max\{f|\gamma_u(i,t)\leq\gamma\})$ that may cover both $p_u$ and P(i,t) at the same time with a circle with a radius $\gamma$. $\chi(P(i,t),\gamma)$ is a sector that has a center $p_u$ and a radius $\gamma$ and is included in H(P(i,t) (see FIG. 8). $t_u(i,\gamma)$ is the largest t for which $\chi(P(i,t),\gamma)$ is not an empty set.

In example Algorithm 3, a process of obtaining $t_u(i,\gamma)$ in O(log n) time will be described in detail. First, only the leaf node W, which is a node that includes only $p_i$, is obtained from $T_u$, and then, P(i,t) is expanded while preventing $\chi(P(i,t),\gamma)$ from being an empty set and moving W to a parent node. More specifically, the set corresponding to the leaf node W at which the algorithm starts is $P(i,1)\{p_i\}$. After moving to the parent node, a union operation of a set $\chi_L$ corresponding to a right child node of W with $P(i,t)(=\chi)$ is performed to expand P(i,t).

When it is not possible to move W to the parent node while making $x(P(i,t),\gamma)$ no longer an empty set, P(i,t) returns to before the union operation with $\chi_L$ and move to the right child node. Thereafter, a union operation of a set $\chi_L$ corresponding to a left child node of w with $P(i,t)(=\chi)$ is performed to expand P(i,t). If $\chi(P(i,t),\gamma)$ is not an empty set, then w moves to the right child node.

If $\chi(P(i,t),\gamma)$ is an empty set, then P(i,t) returns to before performing the union operation with $\chi_L$ and then W move to the left child node. P(i,t) is expanded so that $x(P(i,t),\gamma)$ does not become an empty set until moves to the leaf node. If W is the leaf node and the set corresponding to W is $p_{i+t}$, then $t=t_u(i,\gamma)$.

Figure 9:
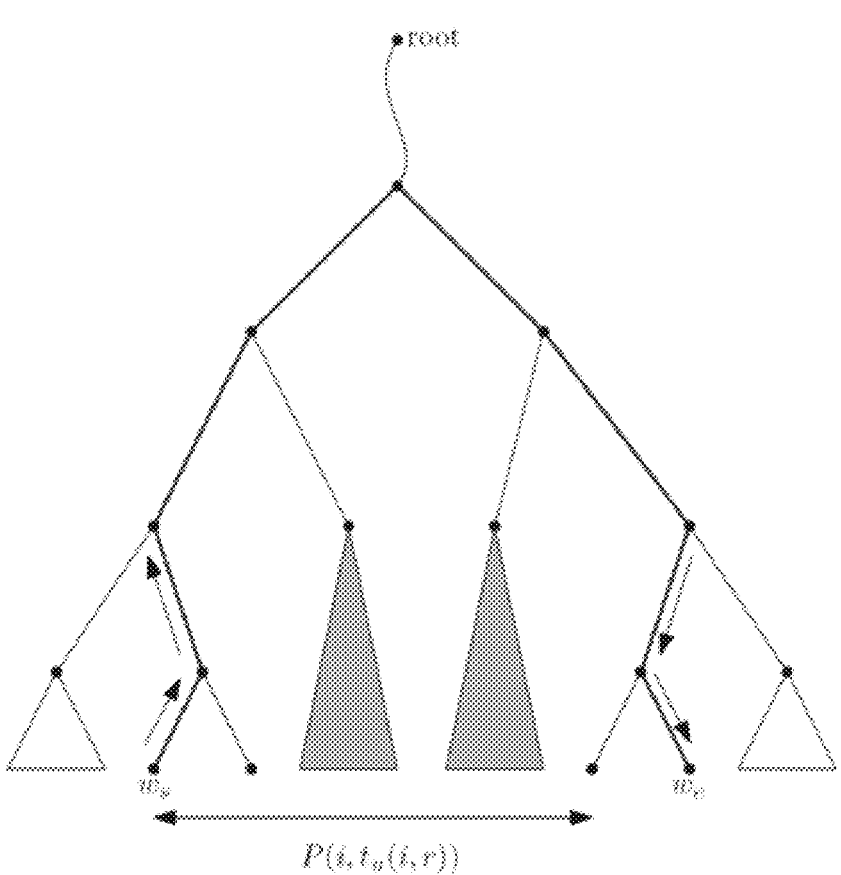
FIG. 9 is a schematic diagram illustrating movement of node W and a position of $t_u(i,\gamma)$ in example Algorithm 3.

FIG. 9 is a schematic diagram illustrating the movement of node W and a position of $t_u(i,\gamma)$ in example Algorithm 3. As illustrated in FIG. 9, the node W moves from $W_s$ to $W_c$ along a red line.

Example Algorithm 3

| Algorithm $t_u$ (i, r ) $K_L$ |
| --- |
| Input: Set of points P = $\{p_1, ..., p_n\}$ satisfying convex position, reference point $^{Pu}$, tree data structure $^{Tu}$, radius $^r$ , natural number $1 \leq i \leq n$ |
| Output: max$\{t|r_u$ (i, t) $\leq^r\}$ |
| 1: Find node $^w$ corresponding to $\{p_i\}$ at $^{Tu}$ |
| 2: $K_L \leftarrow S^1$ (perimeter of unit circle) |
| 3: $K \leftarrow K$ ($^w$, $^r$) |
| 4: while $K_L \cap K \neq 0$ while $^w$ is not root of $^{Tu}$ |
| 5: $K_L \cap K \neq \emptyset$ |
| 6: $^w \leftarrow$ parent ($^w$) |
| 7: $K \leftarrow K$(rightchild ($^w$), $^r$) |
| 8: end while |
| 9: $^w \leftarrow$ rightchild ($^w$) |
| 10: while when w is not leaf node |
| 11: if $K_L \cap K$ (leftchild ($^w$), $^r$) $=\emptyset$then |
| 12: $^w \leftarrow$(leftchild ($^w$) |
| 13: else |
| 14: $K_L \leftarrow K_L \cap K$ (leftchild (w), $^r$) |
| 15: $^w \leftarrow$rightchild (w) |
| 16: end if |
| 17: end while |
| 18: return t so that $^w$ = $\{p_{i+t}\}$ |

In the process of performing example Algorithm 3 in parallel for all i,u, the decision algorithms of example Algorithm 1 or example Algorithm 2 are used to find $t_u(i,\gamma^*)$ for all i,u, without directly calculating $\gamma^*$. The method is known as a parametric search, and $O((n^2 \min\{k, \log n\}+k^2n)$ log n) time is used to calculate all $t_u(i,\gamma^*)$.

Next, after calculating $\gamma_u(i,t_u(i,\gamma^*))$ for all i,u, the binary search is performed between the calculated values. There are a total of $O(n^2)$ $r_u(i,t_u(i,\gamma^*))$, and if the binary search is performed in the same way as the binary search used in the step (S121) of calculating a section including an optimal distance, which is the process of obtaining $(\gamma_U, \gamma_R]$, the accurate value $\gamma^*$ and the arrangement of the corresponding circle may be found using $O((n^2 \min\{k, \log n\}+k^2n)\log n)$ time.

According to an efficient optimal facility location determination method for convex position demand points of the present invention, by enabling very fast calculation compared to the related art, when demand locations satisfy a convex position condition, that is, when demand locations are gathered at a boundary of a specific area, it is possible to quickly calculate a method of efficiently arranging a plurality of facilities in $O((n^2 \min\{k, \log n\}+k^2 n)\log n)$ time.

In addition, according to the present invention, even if positions of demand locations do not satisfy a convex position condition, it is possible to approximate arrangement of facilities, and to be applied to various fields such as a location selection of a warehouse or data clustering.

The present invention may be variously modified and have several forms. Therefore, specific exemplary embodiments of the present invention will be illustrated in the accompanying drawings and be described in detail in the present specification. However, it is to be understood that the present invention is not limited to a specific disclosed form, but includes all modifications, equivalents, and substitutions without departing from the scope and spirit of the present invention.

Unless indicated otherwise, it is to be understood that all the terms used in the specification including technical and scientific terms have the same meaning as those that are generally understood by those who skilled in the art. It should be understood that the terms defined by the dictionary are identical with the meanings within the context of the related art, and they should not be ideally or excessively formally defined unless the context clearly dictates otherwise.

What is claimed is:

1. A method for arranging facilities performed at a computing system having one or more processors and memory, the method comprising:

receiving, by the one or more processors, information regarding a plurality of facilities to be arranged, wherein arranging the plurality of facilities with no restrictions on positioning represents an NP-hard problem;

for each facility of the plurality of facilities, determining, by the one or more processors, whether the facility is arranged so that an optimal distance, which is a distance from a plurality of demand locations with a farthest distance to the facility, is less than or equal to a given distance, wherein the determination comprises:

performing a first type of determination in accordance with a determination that the plurality of facilities does not exceed a threshold number, wherein performing the first type of determination comprises determining whether there is a circle that covers points of a chain function; and performing a second type of determination in accordance with a determination that the plurality of facilities does exceed the threshold number, the second type of determination being different than the first type of determination, wherein performing the second type of determination comprises applying a binary search;

for each facility of the plurality of facilities, calculating, by the one or more processors, an optimal facility location by applying a parametric search function so that a distance between the facility and the plurality of demand locations becomes the optimal distance; and providing, by the one or more processors, arrangement information for the plurality of facilities, the arrangement information including respective optimal facility locations for the plurality of facilities.

2. The method of claim 1, wherein the plurality of demand locations satisfy a convex position condition in which the plurality of demand locations are positioned at vertices of a convex polygon.

3. The method of claim 1, wherein the determination is performed using a decision algorithm, calculating the optimal facility location comprises using an optimization algorithm, and the decision algorithm operates using dynamic programming.

4. The method of claim 1, wherein calculating the optimal facility location includes:

calculating a section including an optimal distance for calculating a section including the optimal distance; and determining an optimal facility location for determining an optimal facility location within the section including the optimal distance.

5. The method of claim 2, wherein the determination is performed using a decision algorithm, calculating the optimal facility location comprises using an optimization algorithm, and the decision algorithm operates using dynamic programming.

6. The method of claim 2, wherein calculating the optimal facility location includes:

calculating a section including an optimal distance for calculating a section including the optimal distance; and determining an optimal facility location for determining an optimal facility location within the section including the optimal distance.

7. The method of claim 1, wherein the threshold number corresponds to logarithmic growth, $O(\log n)$.

8. The method of claim 1, wherein the first type of determination comprises determining whether a circle may be identified that covers a first demand location of the plurality of demand locations and a second demand location of the plurality of demand locations.

9. The method of claim 1, wherein the first type of determination comprises determining whether respective intersections of respective circles centered on respective demand locations of the plurality of demand locations is an empty set.

10. The method of claim 1, wherein the determination comprises determining whether the plurality of demand locations may be covered with a set of circles corresponding to the plurality of facilities.

11. The method of claim 10, wherein each circle of the set of circles has a radius determined using dynamic programming.

12. The method of claim 1, wherein the plurality of facilities comprises a plurality of warehouses.

13. The method of claim 1, wherein the plurality of facilities comprises a plurality of data clusters.

* * * * *